(12) United States Patent
Kaplan et al.

(10) Patent No.: US 7,744,960 B2
(45) Date of Patent: *Jun. 29, 2010

(54) PROCESS FOR COATING FLUOROELASTOMER FUSER MEMBER USING FLUORINATED SURFACTANT

(75) Inventors: Samuel Kaplan, Walworth, NY (US); Alexander N. Klymachyov, Webster, NY (US); Robert N. Finsterwalder, Webster, NY (US); Kenneth W. Schlafer, Fairport, NY (US); Jarad N. Kohl, Rochester, NY (US); Joy L. Longhenry, Webster, NY (US); Alan R. Kuntz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 905 days.

This patent is subject to a terminal disclaimer.

(21) Appl. No.: 11/135,823

(22) Filed: May 23, 2005

(65) Prior Publication Data

US 2006/0263537 A1 Nov. 23, 2006

(51) Int. Cl.
*B05D 3/02* (2006.01)
(52) U.S. Cl. .................... 427/385.5; 427/387
(58) Field of Classification Search ............... 427/385.5
See application file for complete search history.

(56) References Cited

U.S. PATENT DOCUMENTS

| 4,515,884 | A | | 5/1985 | Field et al. |
| 4,571,371 | A | | 2/1986 | Yashiki |
| 4,968,766 | A | | 11/1990 | Kendziorski |
| 5,332,641 | A | | 7/1994 | Finn et al. |
| 5,337,129 | A | | 8/1994 | Badesha |
| 5,395,725 | A | | 3/1995 | Bluett et al. |
| 5,412,034 | A | * | 5/1995 | Tabb ........................ 525/194 |
| 5,463,009 | A | | 10/1995 | Okada et al. |
| 5,547,759 | A | | 8/1996 | Chen et al. |
| 5,568,239 | A | | 10/1996 | Furukawa et al. |
| 5,595,823 | A | | 1/1997 | Chen et al. |
| 5,624,780 | A | | 4/1997 | Nishimori et al. |
| 5,627,000 | A | | 5/1997 | Yamazaki et al. |

(Continued)

FOREIGN PATENT DOCUMENTS

EP 1 167 442 A 1/2002

(Continued)

OTHER PUBLICATIONS

3M Performance Materials Division: "NovecTM Fluorosurfactants for Paints and Coatings" 3m Application Information, Nov. 2003.

(Continued)

*Primary Examiner*—Erma Cameron
(74) *Attorney, Agent, or Firm*—MH2 Technology Law Group LLP (57) ABSTRACT

A process for producing a fuser member coating including a) adding and reacting a fluoroelastomer, a crosslinking agent, a polar solvent, and a fluorinated copolymer surfactant to form a coating solution, and b) providing the coating solution on the fuser member to form a fuser member coating, wherein the fluorinated copolymer surfactant includes a copolymer selected from the group consisting of a fluorinated acrylate copolymer and a fluorinated polyether copolymer.

11 Claims, 1 Drawing Sheet

U.S. PATENT DOCUMENTS

| | | | |
|---|---|---|---|
| 5,636,012 A | 6/1997 | Uneme et al. | |
| 5,641,603 A | 6/1997 | Yamazaki et al. | |
| 5,694,840 A | 12/1997 | Isozaki et al. | |
| 5,695,878 A | 12/1997 | Badesha et al. | |
| 5,698,320 A | 12/1997 | Ebisu et al. | |
| 5,700,568 A | 12/1997 | Badesha et al. | |
| 5,716,747 A | 2/1998 | Uneme et al. | |
| 5,729,813 A | 3/1998 | Eddy et al. | |
| 5,736,250 A | 4/1998 | Heeks et al. | |
| 5,750,204 A | 5/1998 | Badesha et al. | |
| 5,753,307 A | 5/1998 | Badesha et al. | |
| 5,763,131 A | 6/1998 | Bower | |
| 5,880,204 A * | 3/1999 | McCarthy et al. | 524/520 |
| 5,935,712 A | 8/1999 | Tan et al. | |
| 5,945,223 A | 8/1999 | Kuntz et al. | |
| 6,114,041 A | 9/2000 | Tan et al. | |
| 6,156,824 A * | 12/2000 | Yamada et al. | 523/462 |
| 6,159,588 A | 12/2000 | Eddy et al. | |
| 6,197,989 B1 | 3/2001 | Furukawa et al. | |
| 6,207,243 B1 | 3/2001 | Tan et al. | |
| 6,218,014 B1 | 4/2001 | Pickering et al. | |
| 6,395,444 B1 | 5/2002 | Riehle et al. | |
| 6,408,753 B1 | 6/2002 | Finn et al. | |
| 6,479,158 B1 | 11/2002 | Kuntz et al. | |
| 6,514,650 B1 | 2/2003 | Schlueter, Jr. et al. | |
| 6,521,330 B2 | 2/2003 | Finn et al. | |
| 6,555,181 B1 * | 4/2003 | Santos et al. | 427/515 |
| 6,696,158 B1 | 2/2004 | Chen et al. | |
| 6,721,529 B2 | 4/2004 | Chen et al. | |
| 2004/0185270 A1 | 9/2004 | Kaplan et al. | |
| 2004/0185271 A1 | 9/2004 | Kaplan et al. | |
| 2004/0185272 A1 | 9/2004 | Kaplan et al. | |

FOREIGN PATENT DOCUMENTS

| | | |
|---|---|---|
| EP | 1 245 634 A1 | 10/2002 |
| WO | WO 99/55746 A | 11/1999 |

OTHER PUBLICATIONS

M. Terrazas and R. Dams: "A New Generation of Fluorosurfactants", Specialty Chemicals Magazine, vol. 24, No. 3, Mar. 2004, pp. 19-22, www.specchemonline.com.

* cited by examiner

PROCESS FOR COATING FLUOROELASTOMER FUSER MEMBER USING FLUORINATED SURFACTANT

CROSS REFERENCE TO RELATED APPLICATIONS

Reference is directed to, commonly-assigned 1) U.S. application Ser. No. 11/135,812, filed May 23, 2005, entitled, "Process for Coating Fluoroelastomer Fuser Member Using Fluorinated Polydimethylsiloxane Additive;" 2) U.S. application Ser. No. 11/136,171, filed May 23, 2005, entitled, "Process for Coating Fluoroelastomer Fuser Member Using Fluorinated Surfactant and Fluorinated Polydimethylsiloxane Additive Blend;" 3) U.S. application Ser. No. 11/136,166, filed May 23, 2005, entitled, "Process for Coating Fluoroelastomer Fuser Member Using Blend of Two Different Fluorinated Surfactants;" 4) U.S. application Ser. No. 11/135,586, filed May 23, 2005, entitled, "Fuser Member Comprising Deflocculated Material;" and 5) U.S. application Ser. No. 11/135,814, filed May 23, 2005, entitled, "Process for Coating Fluoroelastomer Fuser Member Using Blend of Deflocculated Material and Polydimethylsiloxane Additive;" the subject matter of these applications is hereby incorporated by reference in their entirety.

BACKGROUND

Herein are disclosed fuser members useful in electrostatographic reproducing apparatuses, including digital, image on image, and contact electrostatic printing apparatuses. The present fuser members can be used as fuser members, pressure members, transfuse or transfix members, and the like. In an embodiment, the fuser members comprise an outer layer comprising a fluoroelastomer. In embodiments, the outer layer of the fuser member is prepared by addition of a fluorinated copolymer surfactant in a process for coating a fuser member.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90 to about 200° C. or higher depending upon the softening range of the particular resin used in the toner. It may be undesirable; however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,515,884 to Field et al. discloses a fuser member having a silicone elastomer-fusing surface, which is coated with a toner release agent, which includes an unblended polydimethyl siloxane.

U.S. Pat. No. 6,197,989 B1 to Furukawa et al. discloses a fluorine-containing organic silicone compound represented by a formula.

U.S. Pat. No. 5,736,250 teaches a crosslinked polysiloxane and fluoroelastomer layer.

U.S. Pat. No. 5,716,747 to Uneme et al. discloses a fluororesin coated fixing device with a coating of a fluorine containing silicone oil.

U.S. Pat. No. 5,698,320 to Ebisu et al. discloses a fixing device coated with a fluororesin, and having a fluorosilicone polymer release agent.

U.S. Pat. No. 5,641,603 to Yamazaki et al. discloses a fixing method using a silicone oil coated on the surface of a heat member.

U.S. Pat. No. 5,636,012 to Uneme et al. discloses a fixing device having a fluororesin layer surface, and using a fluorine-containing silicone oil as a repellant oil.

U.S. Pat. No. 5,627,000 to Yamazaki et al. discloses a fixing method having a silicone oil coated on the surface of the heat member, wherein the silicone oil is a fluorine-containing silicone oil and has a specific formula.

U.S. Pat. No. 5,624,780 to Nishimori et al. discloses a fixing member having a fluorine-containing silicone oil coated thereon, wherein the silicone oil has a specific formula.

U.S. Pat. No. 5,568,239 to Furukawa et al. discloses a stainproofing oil for heat fixing, wherein the fluorine-containing oil has a specific formula.

U.S. Pat. No. 5,463,009 to Okada et al. discloses a fluorine-modified silicone compound having a specific formula, wherein the compound can be used for oil-repellency in cosmetics.

U.S. Pat. No. 4,968,766 to Kendziorski discloses a fluorosilicone polymer for coating compositions for longer life.

Known processes for providing surfaces of fuser members include dipping the substrate into a bath of coating solution or spraying the periphery of the substrate with the coating material. Another process for providing surfaces of fuser members involves dripping material spirally over a horizontally rotating cylinder. Generally, in this flow coating method, the coating is applied to the substrate by rotating the substrate in a horizontal position about a longitudinal axis and applying the coating from an applicator to the substrate in a spiral pattern in a controlled amount so that substantially all the coating that exits the applicator adheres to the substrate. For specific details of an embodiment of the flow coating method, attention is directed to U.S. Pat. No. 5,945,223, entitled "Flow Coating Solution and Fuser Member Layers Prepared Therewith" and to U.S. Pat. No. 6,408,753 and U.S. Pat. No. 6,521,330, entitled "Flow Coating Process for Manufacture of Polymeric Printer and Belt Components," and to U.S. Pat. No. 6,479,158, entitled "Fuser Member with an Amino Silane Adhesive Layer and Preparation Thereof," the disclosures of which are hereby incorporated by reference in their entirety. For specific details of an embodiment of fuser roll top coat compositions, attention is directed to U.S. Pat. No. 5,332,641, entitled "Fuser Member with an Amino Silane Adhesive Layer," the disclosure of which is hereby incorporated by reference in its entirety.

However, not all coatings are compatible with the flow coating method. Specifically, only materials that can be completely dissolved in a solvent can be flow coated. Further, it is desirable that the material have the ability to stay dissolved during the entire flow coating process which may take up to approximately 8 hours or longer, and must stay dissolved during the manufacturing period which may be up to several days. Good results are not obtained with materials which tend to coagulate or crystallize within the time period required for flow coating, which may be on the order of about 8 hours and for production manufacturing, may be on the order of a few days, for example, from about 1 to about 4 days. It is desirable to use a material capable of being flow coated for an increased amount of time to enable flow coating in a manufacturing and production environment. It is very costly to periodically shut down a manufacturing line and change the solution delivery system. If the coating does not have the desired properties, the assembly line may need to be shut down often, for example, every hour or every few hours in order to clean the delivery line of coagulated or crystallized material. Therefore, it is desirable to use a material that has good flow coating properties in order to allow for manufacturing to continue for a long period of time, for example several days, without incurring the above problems in the procedure.

It is also desirable that the coating be slow drying to avoid trapping solvent in the under layers which tends to cause bubbles and solvent "pops." Bubbles result from trapped air in the coating which results in non-uniformity of coating and or surface defects. Solvent "pops" are defined as trapped air or solvent voids that rupture resulting in crater-like structures causing non-uniform coated areas or surface defects. In either case, these defects can act as initiation sites for adhesion failures.

Moreover, useful materials for the flow coating process must possess the ability to flow in a manner that allows for the entire roll to be coated. Therefore, it is desirable that the material possess a desired viscosity which allows it to flow over the entire surface of the member being coated. Along with these properties, it is desirable that the material to be coated possess a balance between viscosity and percent solids. Similarly, it is desirable that the coating material have the ability to completely dissolve in a solvent in order to prevent precipitation of the material that can lead to non-uniform flow coating, and imperfections in the final flow coated surface.

The balance between viscosity and percent solids is desired to enable sufficient build rates, which impact throughput and work in process. Build rates are defined as the thickness of a material that can be coated per unit time. The thickness of the material should allow for a balance between maintaining thickness uniformity and avoiding solvent "pops" and air bubbles. Throughput in the process is the number of units that are processed per unit time. Work in process is the number of units currently in any one of the process stages from beginning to end. The objective is to maximize the build rate and reduce the throughput time and work in process.

Many materials are known to be useful for outer coatings of a fuser member, such as for example, silicone rubbers, fluoropolymers and fluoroelastomers, which possess some of the above qualities necessary for flow coating. However, problems may result once the fluoroelastomer is dissolved in a solvent and crosslinking or curing agents are added. For example, the curative or crosslinking agents tend to precipitate within minutes after addition to the solvent solutions. The precipitate causes numerous problems such as clogging the filters and pumps used in the flow coating process. Further, the entire fuser member cannot be coated due to early precipitation of the curing and/or crosslinking agent. In addition, early precipitation may lead to non-uniform flow coating and imperfections in the final flow coated surface. A flow coating solution that minimizes these deficiencies is described in U.S. Pat. No. 5,945,223.

Fuser member layers produced by the flow coating process sometimes exhibit additional defects that may occur particularly when the coatings are very thin, for example less than 50 micrometers in thickness. These defects include "snowflake agglomerates," due to agglomeration of particles such as barium sulfate added to certain fluoroelastomers to prevent the fluoroelastomer pellets from sticking together, and "fisheyes," which are typically 1 to 5 millimeter regions either devoid of a fluoroelastomer layer, or with a very thin fluoroelastomer layer.

Such defects in the fuser member layer can cause undesirable image defects on the printed copy, such as toner spots, toner picking (i.e., removal of toner leaving white spots), non-uniform gloss, hot offset, and poor image permanence. There exists a need for a flow coating solution that forms a fuser member layer surface that is smooth and free or substantially free of such defects.

U.S. Pat. No. 4,571,371 discloses silicone used as a leveling agent in photoreceptor transport layers.

U.S. Pat. Nos. 5,750,204, 5,753,307, 5,700,568 and 5,695,878 to Badesha, et al. teach formulations for fluoroelastomer fuser outer member surfaces using an amino silane as a crosslinking agent.

U.S. Pat. No. 5,595,823 to Chen, et al., U.S. Pat. Nos. 5,729,813 and 6,159,588 to Eddy, et al., and U.S. Pat. No.

6,395,444 to Riehle, et al. disclose fluoroelastomer fuser outer layer compositions for high thermal conductivity.

U.S. Pat. No. 5,547,759 to Chen, et al., discloses formulations for fluoroelastomer coatings for fuser members.

U.S. Pat. Nos. 6,207,243, 6,114,041 and 5,935,712 to Tan, et al., disclose fuser member fluoroelastomer formulations with surface-treated thermally conductive fillers.

U.S. Pat. No. 6,696,158 to Chen, et al. discloses a fluorocarbon thermoplastic coating for fuser members.

U.S. Pat. No. 6,218,014 to Pickering, et al. discloses fluorocarbon fuser members with silicon carbide filler.

U.S. Pat. No. 6,514,650 to Schlueter, Jr. et al. teaches a thin perfluoropolymer outer coating for fuser members.

U.S. Pat. No. 6,721,529 to Chen, et al. discloses a fluoroelastomer coating composition for release agent donor members.

Currently, an acrylate copolymer with pendant glycol and perfluorooctane sulfonate groups has shown success in reducing snowflake agglomerates and fisheyes when used as a surfactant/leveling agent additive in fluoroelastomer coating solutions. However, this copolymer has been shown to demonstrate environmental persistence problems and can no longer be used. Use of other similar materials has resulted in the formation of fisheyes and/or snowflake agglomerates. Therefore, it is desired to provide a fluoroelastomer fuser member layer that reduces or eliminates surface defects, including fisheyes and snowflake agglomerates, and that performs well as a fuser member, and does not degrade other properties or desired features of the fuser member layer.

SUMMARY

Embodiments include a process for producing a fuser member coating comprising a) adding and reacting a fluoroelastomer, a crosslinking agent, a polar solvent, and a fluorinated copolymer surfactant to form a coating solution, and b) providing the coating solution on the fuser member to form a fuser member coating, wherein the fluorinated copolymer surfactant comprises a copolymer selected from the group consisting of a fluorinated acrylate copolymer and a fluorinated polyether copolymer.

Embodiments further include a process for producing a fuser member coating comprising a) adding and reacting a fluoroelastomer, a crosslinking agent, a polar solvent, and a fluorinated acrylate copolymer surfactant having pendant groups selected from the group consisting of perfluoroalkyl sulfonate, glycol, and fluorinated alkyl groups, to form a coating solution, and b) providing the coating solution on the fuser member to form a fuser member coating.

In addition, embodiments include a process for producing a fuser member coating comprising a) adding and reacting a fluoroelastomer, a crosslinking agent, a polar solvent, and a fluorinated polyether copolymer surfactant having pendant trifluoroethoxy groups to form a coating solution, and b) providing the coating solution on the fuser member to form a fuser member coating.

Moreover, embodiments include a process for producing a fuser member coating comprising a) adding and reacting a fluoroelastomer, a crosslinking agent, a polar solvent, and a fluorinated copolymer surfactant to form a coating solution, and b) providing the coating solution on the fuser member to form a fuser member coating, wherein the fluorinated copolymer surfactant comprises a copolymer selected from the group consisting of a fluorinated acrylate copolymer and a fluorinated polyether copolymer, and further wherein the fluoroelastomer is selected from the group consisting of a) copolymers of two of vinylidene fluoride, hexafluoropropylene, and tetrafluoroethylene, b) terpolymers of vinylidene fluoride, hexafluoropropylene, and tetrafluoroethylene, and c) tetrapolymers of vinylidene fluoride, hexafluoropropylene, tetrafluoroethylene, and a cure site monomer.

BRIEF DESCRIPTION OF THE DRAWINGS

For a better understanding of the present invention, reference may be had to the accompanying figures.

DETAILED DESCRIPTION

Herein are described fuser member outer layers comprising a fluoroelastomer, and prepared by addition of a fluorinated copolymer as a surfactant during coating of the fluoroelastomer outer layer. The process, in embodiments, provides a fuser member outer layer that performs well as a fuser member, and reduces or eliminates the problems of fisheyes and snowflake agglomerates. In addition, the fuser member layers are smooth, in embodiments, and have improved mechanical and chemical properties. Moreover, in embodiments, the occurrence of hot offset and stripping failures are reduced or eliminated. Further, in embodiments, image quality is enhanced.

Figure 1:
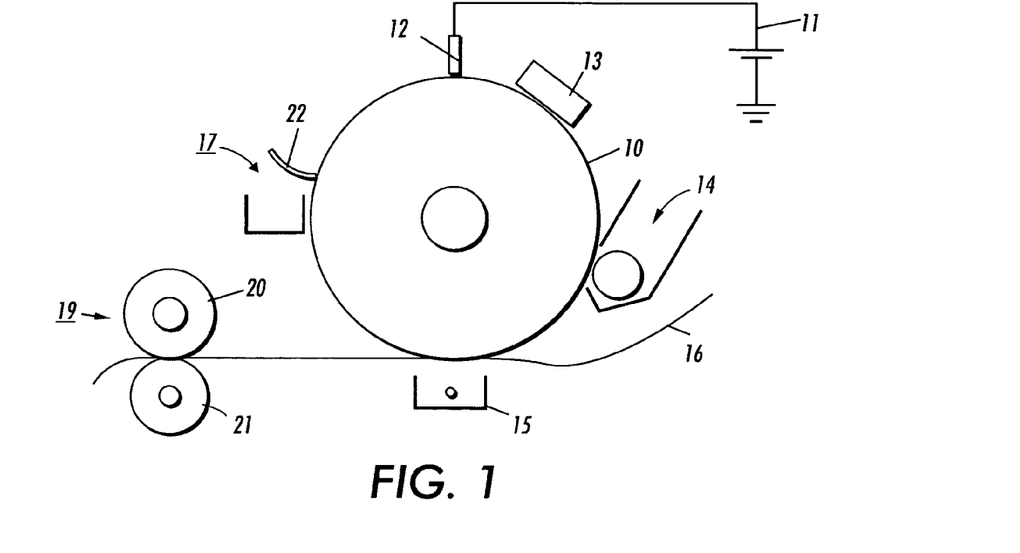
FIG. 1 is a schematic illustration of an image apparatus in accordance with an embodiment.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG.

1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
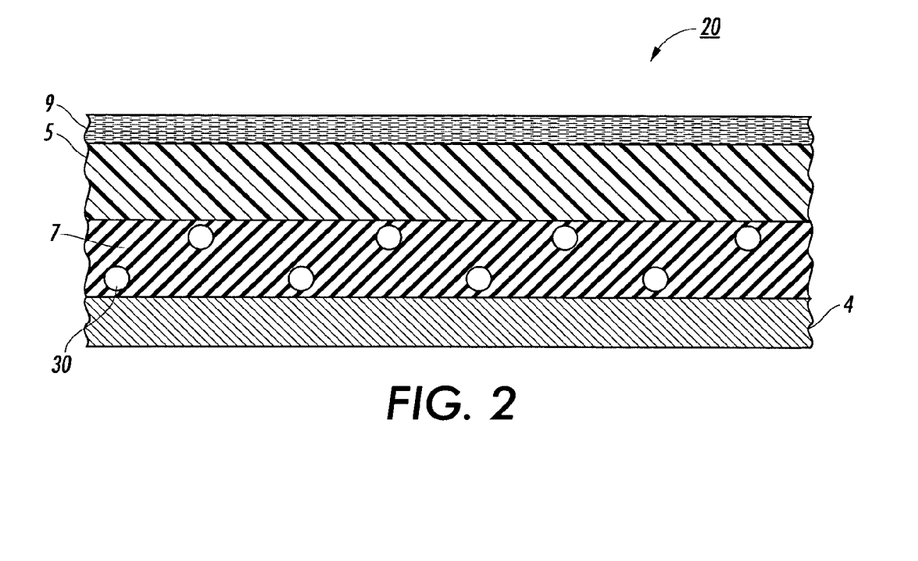
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 4 has intermediate layer 7 thereon. Intermediate layer 7 can be, for example, a rubber such as silicone rubber or other suitable rubber material. As shown in FIG. 2, intermediate layer 7 can have fillers 30 dispersed or contained therein. The substrate and/or outer layer can also have fillers dispersed or contained therein (fillers not shown). The optional fillers for the three layers can be the same or different. On intermediate layer 7 is positioned outer layer 5 comprising a fluoroelastomer as described below. Positioned on outer fluoroelastomer layer 5 is outermost liquid release layer 9.

The fuser member can be in the form of a roller, sheet, belt, film, drelt (hybrid between a drum and a belt), or the like. In embodiments, the fuser member is in the form of a cylindrical roller, wherein the roller substrate has a metal core, such as aluminum, steel, stainless steel, or the like metal substrate.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP® The VITON® designation is a Trademark of E.I. DuPont de Nemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene with about 2 weight percent cure site monomer.

The thickness of the outer layer of the fuser member is from about 10 to about 500 micrometers, or from about 10 to about 40 micrometers.

The amount of fluoroelastomer compound in solution in the outer layer solution is from about 5 to about 40 percent, or from about 16 to about 22 percent by weight of total solids. Total solids as used herein include the amount of fluoroelastomer, crosslinking agent, solvent, surfactant, dehydrofluorinating agent, surfactant, and optional adjuvants and fillers, including optional metal oxide fillers.

An inorganic particulate filler may be used in connection with the fluoroelastomer outer layer, in order to provide anchoring sites for the functional groups of the silicone fuser agent. Examples of suitable fillers include a metal-containing filler, such as a metal, metal alloy, metal oxide, metal salt or other metal compound. The general classes of metals, which are applicable herein, include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina respectively. The filler may be included in the substrate, and/or intermediate layer, and/or outer layer. The optional filler in the various layers may be the same or different.

Optional intermediate adhesive layers and/or intermediate polymer or elastomer layers may be applied to achieve desired properties and performance objectives of the present invention. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 10 mm.

Suitable release agents or fusing oils can be provided onto the outer layer of the fuser member via a delivery mechanism such as a delivery roll. The delivery roll is partially immersed in a sump, which houses the fuser oil or release agent. The oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

The fluoroelastomer fuser coating can be prepared by adding a surfactant and/or additive to the fluoroelastomer coating solution, prior to coating of the fluoroelastomer in solution on the fuser member. The details of the process are as follows.

In embodiments, coating solutions comprise a polymer and a fluorine-containing material. More specifically, the coating can comprise a polymer such as a fluoropolymer, a curative system appropriate for the particular polymer, and additional additives to assist with curing and to improve mechanical and thermal properties of the coated layer. The coating solution can also comprise a fluorine-containing material such as a fluorine-containing polysiloxane, or a fluorine-containing surfactant that is not a polysiloxane, or a blend of a fluorine-containing polysiloxane and a fluorine-containing surfactant, or a blend of at least two distinguishing fluorine-containing surfactants to provide coatings that are free of or have a reduced numbers of defects. Optionally, additives may be used to increase pot-life to an acceptable time. All of these components are added to a solvent in order to form a solution/dispersion, which is applied to the fuser roll by the flow coating or other coating method.

Examples of suitable fluorine-containing polysiloxane additives include polysiloxanes with pendant fluorinated groups, such as $CF_3(CF_2)_n(CH_2)_m$—. In embodiments, the polysiloxanes having pendant fluorinated groups include those having the following Formula I:

wherein m and n represent the number of repeating units and are the same or different, and m is from about 0 to about 25 or from about 1 to about 10, or from about 1 to about 5, or about 2; and n is from about 1 to about 25, or from about 2 to about 12, or from about 3 to about 7, or about 5. The extent of incorporation of the pendant fluorocarbon chains, defined as $x/(x+y)$ is from about 1 percent to about 100 percent, from about 4 percent to about 20 percent, from about 5 to about 10 percent, or about 5.7 percent. The groups, $R_1$ and $R_2$ can be the same or different and are selected from the group consisting of alkyl having from about 1 to about 18 carbon atoms, such as methyl, ethyl, propyl, butyl and the like; arylalkyl groups having from about 1 to about 18 carbons, such as methylphenyl, ethylphenyl, propylphenyl, butylphenyl and the like; amino groups; and alkylamino groups having from about 1 to about 18 carbons, such as methylamino, ethylamino, propylamino, butylamino and the like. The group $R_3$ is selected from the group consisting of alkyl and arylalkyl groups such as those just listed, a polyorganosiloxane chain having from about 1 to about 300 repeat units, and a fluorochain of the formula —$(CH_2)_o$—$(CF_2)_p$—$CF_3$ where o and p have the same ranges as m and n, respectively, but may be the same or different than m and n.

A specific example of a fluorine-containing polysiloxane additive is one having the following Formula II:

wherein in Formula II, $x/(x+y)$ is about 5.7%.

In embodiments, the viscosity of the polydimethylsiloxane additive is from about 50 to about 2000 cS, or from about 100 to about 500 cS, or about 220 cS.

Examples of suitable fluorinated surfactants include acrylate copolymers with pendant glycol and/or perfluoroalkyl sulfonate groups. An example of a fluorinated acrylate copolymer surfactant includes one having the following Formula III:

wherein $m/(m+n)$ is from 0 to about 1, or from about 0.2 to about 0.8, or from about 0.5 to about 0.6; $R_1$ is hydrogen, or an alkyl group having from about 1 to about 18 carbons, or from about 1 to about 10 carbons; and $R_2$ is hydrogen, an alkyl group having from about 1 to about 18 carbons, or from about 1 to about 10 carbons or $R_2$ is a connection point to an acrylate polymer backbone, thus creating an inter- or intra-molecular bridge; x is a number of from about 1 to about 10, or from about 1 to about 5, or about 3; a is a number of from about 1 to about 50, or from about 1 to about 30, or from about 5 to about 20; b is a number of from about 1 to about 100, or from about 5 to about 50, or from about 10 to about 30; and c is a number of from about 1 to about 50, or from about 1 to about 30, or from about 5 to about 20. Examples of commercially available fluorine-containing surfactants falling within the above Formula III include Fluorad® FC-4430 and Fluorad® FC-4432, commercial products sold by 3M. For these particular surfactants: $R_1$=$CH_3$, x=3, a is about 10, b is about 20 and c is about 10. For Fluorad™ FC-4430 m/(m+n) is about 0.5, and for Fluorad™ FC-4432 m/(m+n) is about 0.6.

Examples of other suitable fluorinated surfactants include acrylate copolymers with pendant alkyl and/or fluorinated alkyl groups. An example of a suitable fluorinated acrylate copolymer is one having the following Formula IV:

wherein m/(m+n) is from 0 to about 1, or from about 0.1 to about 0.4, or about 0.25; x is a number of from about 1 to about 20, or from about 5 to about 10; y is a number of from about 1 to about 25, or from about 5 to about 15. A commercially available example of a fluorine-containing surfactant falling within the above Formula IV is Zonyl® FSG, a commercial product sold by E.I. DuPont de Nemours and Company. For this surfactant, x is about 7 and y is about 11 and m/(m+n) is about 0.25.

Other examples of suitable surfactants are polyether copolymers with pendant trifluoroethoxy groups. An example of a suitable fluorinated polyether copolymer is one having the following Formula V:

wherein x/(x+y+z) is from about 0% to about 100%, or about 50% to about 100%; y/(x+y+z) is from about 0% to about 50% or about 1% to about 20%; and z/(x+y+z) is from about 0% to about 30% or from 1% to about 10%. A commercially available example is Polyfox® surfactant available from Omnova.

In embodiments, the fuser member coating formulation solution comprises a blend of a fluorine-containing polysiloxane of Formula I or II, in combination with a fluorine-containing surfactant of Formula III, Formula IV and/or Formula V. In embodiments, the fuser member coating comprises a blend of two different fluorinated copolymer surfactants, such as two or more of a fluorine-containing surfactant of Formula III, Formula IV, and/or Formula V.

In embodiments, the fluorine-containing polysiloxane or fluorine-containing surfactant or the blend of fluorine-containing polysiloxane and fluorine-containing surfactant or the blend of at least two fluorine-containing surfactants, is added to the fluoroelastomer coating solution in an amount of from about 0.5 to about 20 pph, or from about 3 to about 10 pph, wherein pph is expressed with respect to the amount of fluoroelastomer in the coating solution.

In embodiments, the blend of fluorine-containing polysiloxane and fluorine-containing surfactant contains about 0 to about 100, or from about 1 to about 40, or from about 5 percent to about 30 percent polysiloxane.

Addition of a fluorine-containing polysiloxane, a fluorine-containing surfactant, a blend of a fluorine-containing polysiloxane and a fluorine-containing surfactant, or a blend of at least two fluorine-containing surfactants to the fluoroelastomer coating solution, results in formation of an outer fluoroelastomer fuser member layer which, in embodiments, functions well in fusing toner to a copy substrate. The fuser member coating, in embodiments, is smooth, and has few, if any, defects. In embodiments, the number of fisheyes and snowflake agglomerates are reduced or eliminated. Also, there is no deterioration in hot offset or stripping performance and no deterioration in image quality in embodiments.

In embodiments, the fluoroelastomer coating is applied to the fuser member substrate using the flow coating process, although other processes such as dip coating and spray coating may be employed. In general, flow coating involves the deposition of a coating solution onto the substrate by rotating the substrate about its longitudinal axis and applying the coating from an applicator to the substrate in a spiral pattern in a controlled amount so that substantially all the coating that exits the applicator adheres to said substrate. The details of the flow coating procedure can be found in U.S. Pat. Nos. 5,945,223, 6,408,753, 6,521,330 and in U.S. Pat. No. 6,479,158, the disclosures of which are hereby incorporated by reference in their entirety.

In embodiments, the viscosity of the polydimethylsiloxane surfactant is from about 75 to about 1,500 cS, or from about 200 to about 1,000 cS, or about 220 cS.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Formation of Fuser Member Coating

A fuser member coating formulation was prepared from a solvent solution/dispersion containing 100 parts by weight of a hydrofluoroelastomer, DuPont Viton® GF, a tetrapolymer of 35 weight percent vinylidenefluoride, 34 weight percent hexafluoropropylene, 29 weight percent tetrafluoroethylene, and 2 weight percent of a cure site monomer. The Viton® GF was mixed with 7 parts by weight of DuPont Viton® Curative 50, 1.5 parts by weight magnesium oxide (Maglite D available from C. P. Hall, Chicago, Ill.), 0.75 parts by weight calcium hydroxide, 0.75 parts by weight carbon black (N990 available from R. T. Vanderbilt Co.), 5.6 parts by weight Novec® FC-430 (available from 3M) in a mixture of methylethylketone and methylisobutyl ketone, which was dispensed onto a fuser roll surface via flow coating to a nominal thickness of about 20 micrometers. The coating was cured by stepwise heating in air at 95° C. for 2 hours, 175° C. for 2 hours, 205° C. for 2 hours, and 230° C. for 16 hours.

Example II

Formation of Fuser Member Coating Comprising Fluorine-Containing Surfactant

A fuser roll topcoat formulation was prepared identically to Example I except that in place of the Novec™ FC-430, 5.6 parts by weight of Novec™ FC-4430 or Novec™ FC-4432, described by Formula III above, was used.

Example III

Formation of Fuser Member Coating Comprising Fluorine-Containing Polysiloxane Additive A fuser member coating formulation was prepared identically to Example I except that in place of the Novec™ FC-430, 5.6 parts by weight of the fluorinated silicone described above in Formula II was used.

Example IV

Formation of Fuser Member Coating Comprising Blend of Fluorine-Containing Polydimethylsiloxane Additive and Fluorine-Containing Surfactant A fuser member coating formulation was prepared identically to Example I except that in place of the Novec™ FC-430, a blend of 4.75 parts by weight of Novec™ FC-4430 or Novec™ FC-4432 and 1.0 parts by weight of the fluorinated silicone described by Formula II, were used.

Example V

Comparative Testing

The fuser member coatings prepared above were visually inspected for defects, and the results are indicated in Table I.

TABLE I

Comparison of Defects in 20 micrometer Fuser Member Coatings Prepared with Different Additives

| Example | Manufacturer | Commercial Designation | Description | Fisheyes* | Snowflake Agglomerates* |
|---|---|---|---|---|---|
| | | | No additive | 100% | 100% |
| I | 3M | FC430 | Acrylate with pendant perfluorooctanesulfonate & polyol groups | 1% | <1% |
| II | 3M | FC4430, FC4432 | Acrylate with pendant perfluorobutanesulfonate & polyol groups | 50% | <1% |
| III | Wacker | See Formula II | Fluorinated polysiloxane | <1% | 100% |
| IV | 3M & Wacker | FC4430 & Formula II Blend | Blend of Examples II and III | <1% | <1% |
| | Omnova | Polyfox | Polyether with pendant trifluoroethoxy containing groups | <1% | >50% |
| | DuPont | Zonyl FSG | Copolymer of perfluorooctyl-2-ethyl methacrylate/lauryl methacrylate in Isopar H | ~50% | ~50% |

*Values refer to the percentage of rolls rejected due to the occurrence of at least one defect.

First it should be noted that both snowflake agglomerates and fisheye defects were present in all coatings prepared from formulation solutions that did not contain any fluorinated polysiloxane or fluorinated surfactant additives. Addition of the fluorinated surfactant FC430 reduced fisheye and snowflake agglomerate defects to a very low level (Example 1). However, FC430 is no longer available. Substitution of its replacement, FC4430, or FC4432 in the coating solution yields a very low number of snowflake agglomerates. Even though the coatings have fisheye defects (Example II), the formula is improved. Alternatively, addition of a fluorinated polysiloxane of Formula II to the coating solution results in a significant decrease in fisheye defects. Even though the coatings have a snowflake agglomerates (Example III), the formula is improved. Addition of a blend of a fluorine-containing polysiloxane and a fluorine-containing surfactant to the outer fuser member coating solution significantly reduces both snowflake agglomerates and fisheye defects to very low levels (Example IV). Furthermore, fuser roll outer coatings prepared by the formulation in Example IV show no deterioration in fuser offset performance or image quality when compared to rolls with outer coatings produced by the other formulations. Also shown in Table I are the results from two other surfactants, Polyfox and Zonyl FSG, available from Omnova and DuPont, respectively. Polyfox additive shows significant improvement of fisheye defects with limited improvement in snowflake agglomerate defects, while the Zonyl FSG shows a limited reduction in both defects.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A process for producing a fuser member coating comprising:
a) adding and reacting a fluoroelastomer, a crosslinking agent, a polar solvent, and a fluorinated copolymer surfactant blended with a fluorine-containing polysiloxane additive to form a coating solution,
wherein said fluoroelastomer is selected from the group consisting of a) copolymers of two of vinylidene fluoride, hexafluoropropylene, and tetrafluoroethylene, b) terpolymers of vinylidene fluoride, hexafluoropropylene, and tetrafluoroethylene, and c) tetrapolymers of vinylidene fluoride, hexafluoropropylene, tetrafluoroethylene, and a cure site monomer, and
wherein said fluorine-containing polysiloxane additive comprises pendant fluorinated groups and has the following formula:

wherein m is a number ranging from about 0 to about 25; n is a number ranging from about 1 to about 25; x/(x+y) ranges from about 1 percent to about 100 percent; $R_1$ and $R_2$ are independently selected from the group consisting of alkyl groups having from about 1 to about 18 carbon atoms, arylalkyl groups having from about 1 to about 18 carbons, amino groups, and alkylamino groups having from about 1 to about 18 carbons; and $R_3$ is selected from the group consisting of an alkyl having from about 1 to about 18 carbons, an arylalkyl having from about 1 to about 18 carbons, a polyorganosiloxane chain having from about 1 to about 300 repeat units, and a fluoro-chain having a formula of $-(CH_2)_o-(CF_2)_p-CF_3$ wherein o is a number of from about 0 to about 25, and p is a number of from about 1 to about 25; and
b) providing said coating solution on said fuser member to form a fuser member coating, wherein said fluorinated copolymer surfactant comprises a copolymer selected from the group consisting of a fluorinated acrylate copolymer and a fluorinated polyether copolymer.

2. A process in accordance with claim 1, wherein said fluorinated acrylate copolymer comprises a pendant perfluoroalkyl sulfonate groups.

3. A process in accordance with claim 2, wherein said fluorinated acrylate copolymer further comprises pendant glycol groups.

4. A process in accordance with claim 3, wherein said fluorinated acrylate copolymer has the following Formula III:

wherein m/(m+n) is from 0 to about 1; $R_1$ is selected from the group consisting of hydrogen and an alkyl group having from about 1 to about 18 carbons; $R_2$ is selected from the group consisting of hydrogen and an alkyl group having from about 1 to about 18 carbons; x is a number of from about 1 to about 10; a is a number of from about 1 to about 50; b is a number of from about 1 to about 100; and c is a number of from about 1 to about 50.

5. A process in accordance with claim 4, wherein m/(m+n) is from about 0.2 to about 0.8.

6. A process in accordance with claim 4, wherein m/(m+n) is from about 0.5 to about 0.6.

7. A process in accordance with claim 1, wherein said fluoroelastomer comprises about 35 weight percent of vinylidenefluoride, about 34 weight percent of hexafluoropropylene, about 29 weight percent of tetrafluoroethylene, and about 2 weight percent cure site monomer.

8. A process in accordance with claim 1, wherein said coating solution is applied to said fuser member using a process selected from the group consisting of a) a flow coating process, b) a spray coating process, and c) a dip coating process.

9. A process in accordance with claim 1, wherein said coating solution is applied to said fuser member in an amount to provide a dry thickness of from about 10 to about 500 micrometers.

10. A process in accordance with claim 1, wherein said fluorinated copolymer surfactant is present in said coating solution in an amount of from about 0.5 to about 20 pph based on an amount of fluoroelastomer.

11. A process for producing a fuser member coating comprising:
a) adding and reacting a fluoroelastomer, a crosslinking agent, a polar solvent, and a fluorine-containing polysiloxane additive blended with a fluorinated acrylate copolymer surfactant having pendant groups selected from the group consisting of perfluoroalkyl sulfonate, glycol, and fluorinated alkyl groups, to form a coating solution,
wherein said fluoroelastomer is selected from the group consisting of a) copolymers of two vinylidene fluoride, hexafluoropropylene and tetrafluoroethylene, b) terpolymers of vinylidende fluoride, hexafluoropropylene, and tetrafluoroethylene, and c) tetrapolyumers of vinylidene fluoride, hexafluoropropylene, tetrafluoroethylene, and a cure site monomer, and wherein said fluorine-containing polysiloxane additive comprises pendant fluorinated groups and has the following formula:

wherein m is a number ranging from about 0 to about 25; n is a number ranging from about 1 to about 25; x/(x+y) ranges from about 1 percent to about 100 percent; $R_1$ and $R_2$ are independently selected from the group consisting of alkyl groups having from about 1 to about 18 carbon atoms, arylalkyl groups having from about 1 to about 18 carbons, amino groups, and alkylamino groups having from about 1 to about 18 carbons; and $R_3$ is selected from the group consisting of an alkyl having from about 1 to about 18 carbons, an arylalkyl having from about 1 to about 18 carbons, a polyorganosiloxane chain having from about 1 to about 300 repeat units, and a fluoro-chain having a formula of $-(CH_2)_o-(CF_2)_p-CF_3$ wherein o is a number of from about 0 to about 25, and p is a number of from about 1 to about 25; and b) providing said coating solution on said fuser member to form a fuser member coating.

* * * * *